United States Patent
Jensen et al.

[11] Patent Number: 5,700,300
[45] Date of Patent: Dec. 23, 1997

[54] ELECTROLYTE COATING SYSTEM FOR POROUS ELECTRODES

[75] Inventors: Gert Jensen, Boulder City, Nev.; Dale Shackle, Morgan Hill, Calif.

[73] Assignee: Valence Technology, Inc., Henderson, Nev.

[21] Appl. No.: 689,586

[22] Filed: Aug. 12, 1996

[51] Int. Cl.$^6$ .................................................. H01M 6/00
[52] U.S. Cl. ........................................ 29/623.5; 29/623.1
[58] Field of Search .................... 29/623.1, 623.5; 427/212, 220

[56] References Cited

U.S. PATENT DOCUMENTS

| | | |
|---|---|---|
| 5,474,857 | 12/1995 | Uchida et al. ................. 29/623.5 |
| 5,492,543 | 2/1996 | Lim .................................. 29/623.1 |
| 5,558,954 | 9/1996 | Morrison ......................... 29/623.1 |
| 5,584,893 | 12/1996 | Mitchell .......................... 29/623.5 |

*Primary Examiner*—Bruce F. Bell
*Attorney, Agent, or Firm*—Karen S. Perkins

[57] ABSTRACT

The subject invention provides a three-step process for electrolyte deposition. A surplus of electrolyte pre-wet material, having a relatively low viscosity, is layered onto a dry, porous electrode. Surplus pre-wet material is mechanically removed from the surface of the electrode. This also removes bubbles or foaminess which has developed in the pre-wet material. The pre-wet solution is allowed to absorb into the porous electrode, and the surface is then coated with the high-viscosity electrolyte precursor. Curing or further processing of the electrode/electrolyte then continues with standard processes.

14 Claims, 5 Drawing Sheets

ELECTROLYTE COATING SYSTEM FOR POROUS ELECTRODES

TECHNICAL FIELD

This invention relates generally to solid electrochemical devices. More particularly, the present invention pertains to a method of fabricating a battery cell having a solid electrolyte laminated onto a porous electrode structure.

BACKGROUND OF THE INVENTION

Electrolytic cells containing an anode, a cathode, and a solid, solvent-containing electrolyte are known in the art, and are commonly referred to as "solid batteries". During discharge, lithium ions from the anode passes through the electrolyte to the electrochemically active material of the cathode, where the ions are taken up with the simultaneous release of electrical energy. During charging, the flow of ions is reversed so that lithium ions pass from the electrochemically active cathode material through the electrolyte and are reintroduced back onto or into the anode.

A solid, secondary battery typically comprises several solid, secondary electrolytic cells in which the current from each of the cells is accumulated by a conventional current collector so that the total current generated by the battery is roughly the sum of the current generated from each of the individual electrolytic cells employed in the battery. Such an arrangement enhances the overall current produced by the battery to levels which render such batteries commercially viable.

As shown in cross-sectional view in FIG. 1, such batteries include an anode 110, a cathode 112, and an electrolyte layer 114 interposed between the anode 110 and the cathode 112. An anode current collector 116 may be present, as may a cathode current collector 118.

During manufacture of the solid batteries of the prior art, the viscous electrolyte precursor is layered onto the anode or the cathode. The viscous electrolyte precursor is then cured or processed in place (for example, by evaporation of a carrier solvent, by heating, by application of an e-beam, or the like) to form the solid electrolyte.

FIGS. 2a and 2b show the formation of an electrode. FIG. 2c shows the deposition of a viscous electrolyte precursor according to the methods of the prior art.

As shown in FIG. 2a, an electrode (cathode or anode) paste 220 includes particulate electrode material 222 suspended in a carrier liquid 224. In the case of an anode, the particulate material 222 would be an anode active material. In the case of a cathode, the particulate material 222 would be cathode active material. The electrode paste is layered onto a current collector 226. The carrier liquid is then removed, for example by volatilization (drying) or other methods. The porous electrode structure 228 which remains, as shown in FIG. 2b, includes particulate electrode material held adjacent a current collector 226.

FIG. 2c shows the deposition of the viscous electrolyte precursor material 230 over the porous electrode structure 228. The traditional viscous electrolyte precursor 230 typically has a viscosity greater than 300 centipoise, generally in the range of 300 to 2,000 cp, more usually from 800 to 1,000 cp. This prior art electrolyte deposition process, however, has proved to have significant drawbacks. Deposition of the uncured viscous electrolyte precursor onto the electrode structure 228 causes the formation of bubbles 232, or foam, within the viscous electrolyte precursor 230. These bubbles can result in internal air pockets in the cured electrolyte product, causing undesired internal resistivity and adversely affecting battery performance.

In addition to the foaming which occurs upon deposition of the viscous electrolyte precursor, it has been found that contact between the viscous electrolyte precursor 230 (and, subsequently, the solid electrolyte, not shown) and the particulate electrode material 222 can be insufficient. Poor mechanical and/or chemical contact between the electrode and the electrolyte also yields high internal resistivity and poor battery performance.

In view of the above shortcomings associated with the prior art, there is a need for solid state electrochemical devices that are capable of providing improved manufacturing parameters.

SUMMARY OF THE INVENTION

The subject invention provides a three-step process for electrolyte deposition. A surplus of electrolyte pre-wet material, having a relatively low viscosity, is layered onto a dry, porous electrode. Surplus pre-wet material is mechanically removed from the surface of the electrode. This also removes bubbles or foaminess which has developed in the pre-wet material. The pre-wet solution is allowed to absorb into the porous electrode, and the surface is then coated with the high-viscosity electrolyte precursor. Curing or further processing of the electrode/electrolyte then continues with standard processes.

BRIEF DESCRIPTION OF THE DRAWINGS

FIGS. 2a and 2b show formation of the porous electrode. FIG. 2c shows the deposition of the viscous electrolyte precursor.

FIGS. 3a and 3b show formation of the porous electrode. FIG. 3c shows the deposition of the low-viscosity electrolyte pre-wet, with the foaming of the pre-wet solution upon deposition. FIG. 3d shows removal of the foamy fraction of the pre-wet solution. FIG. 3e shows the absorption of the pre-wet solution into the porous electrode material. FIG. 3f shows the coating of the viscous electrolyte precursor material onto the surface of the pre-wet electrode.

The Figures are drawn for clarity and are not drawn to scale. Similar numbers refer to similar structures throughout the Figures.

DETAILED DESCRIPTION OF THE INVENTION

An electrochemical cell or battery has a negative electrode side, a positive electrode side, and a separator therebetween. The term "solid, secondary electrolytic cell" refers to a composite electrolytic cell comprising an anode, a solid, solvent-containing electrolyte, and a cathode comprising a cathodic material capable of repeated charge/discharge cycles so as to permit repeated reuse where the electrolyte is interposed between the anode and the cathode.

Figure 1:
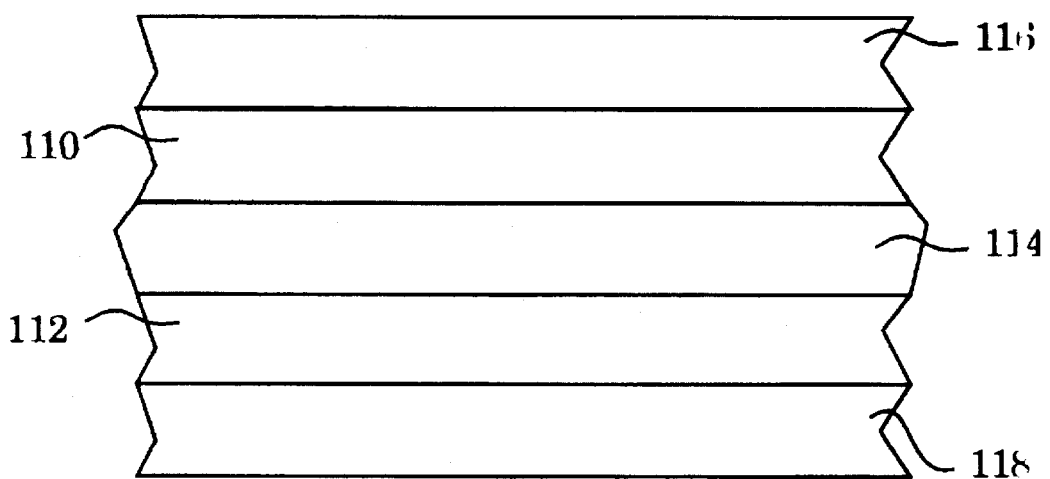
FIG. 1 shows a cross-sectional view of a typical battery of the prior art, including anode, cathode, solid electrolyte, and current collectors.
Figure 2A:
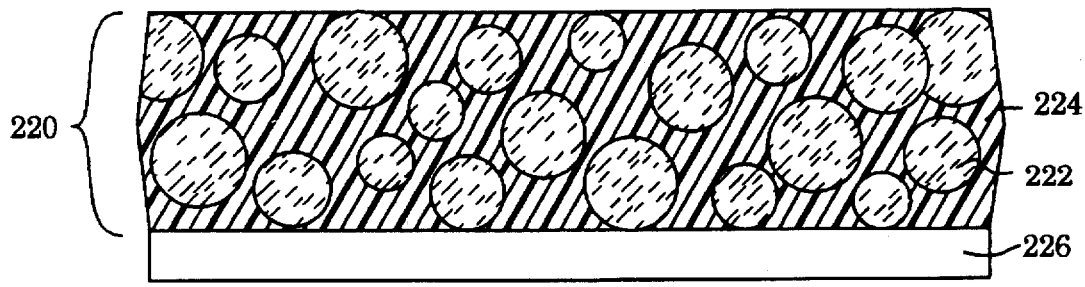
FIGS. 2a through 2c show the prior art processes.
Figure 2B:
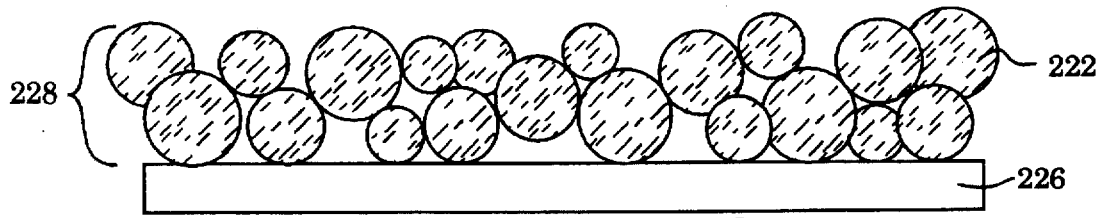
Figure 2C:
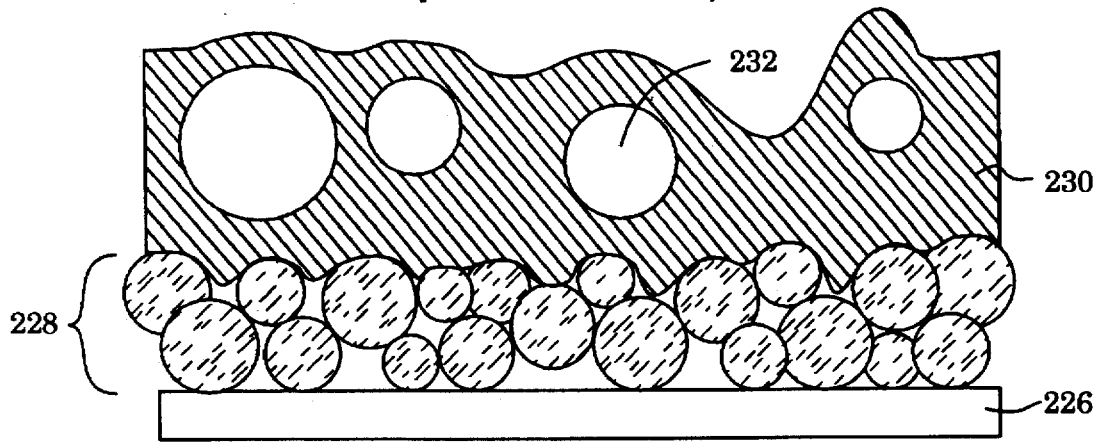
Figure 3A:
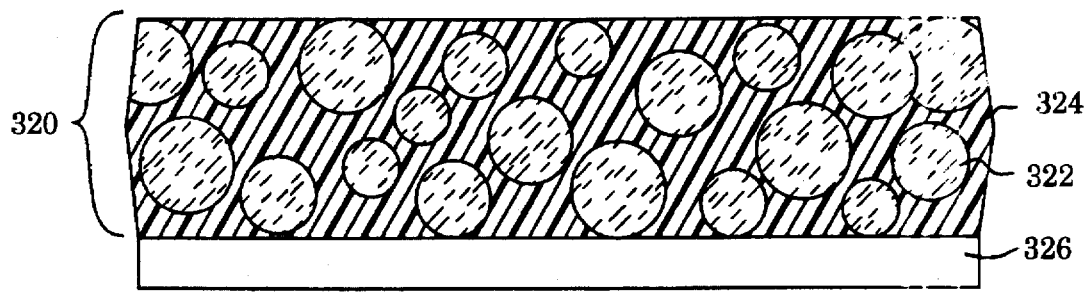
FIGS. 3a through 3f illustrate the subject processes.
Figure 3B:
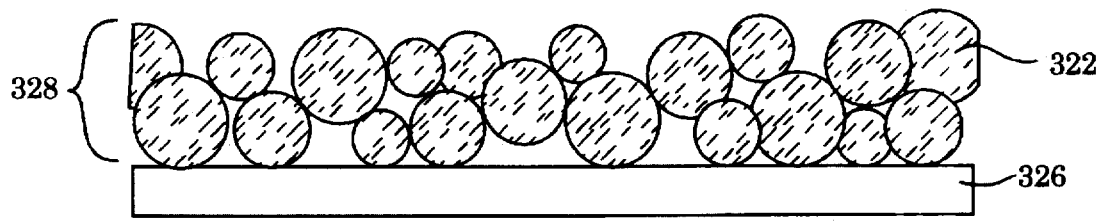
Figure 3C:
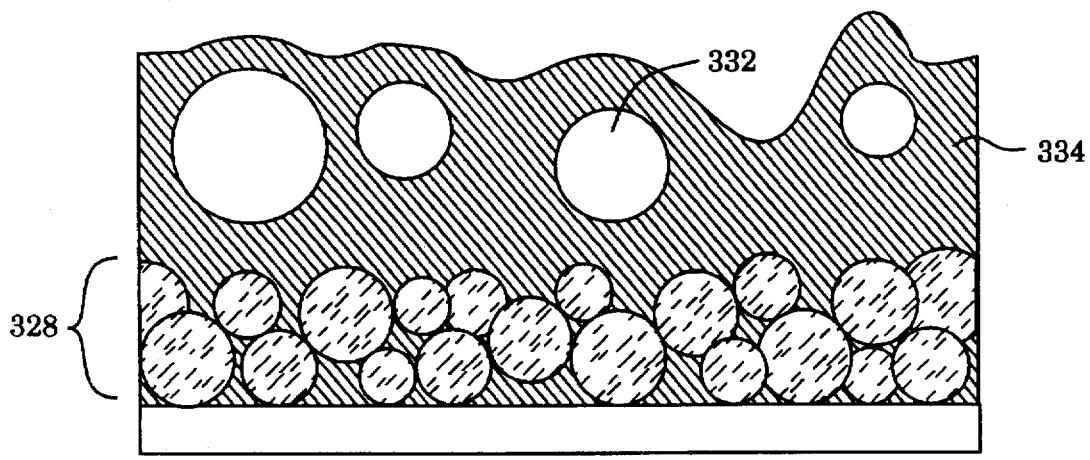
Figure 3D:
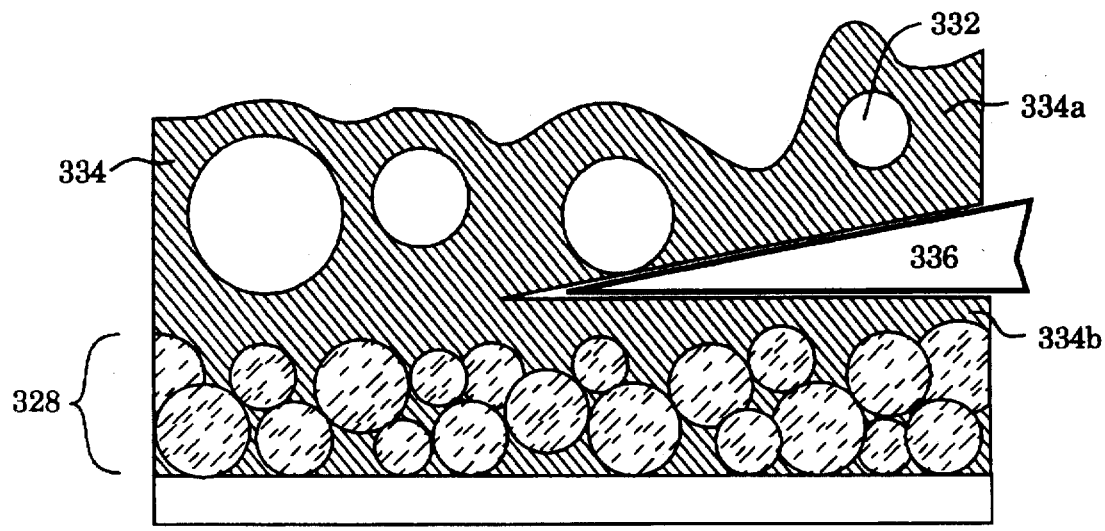
Figure 3E:
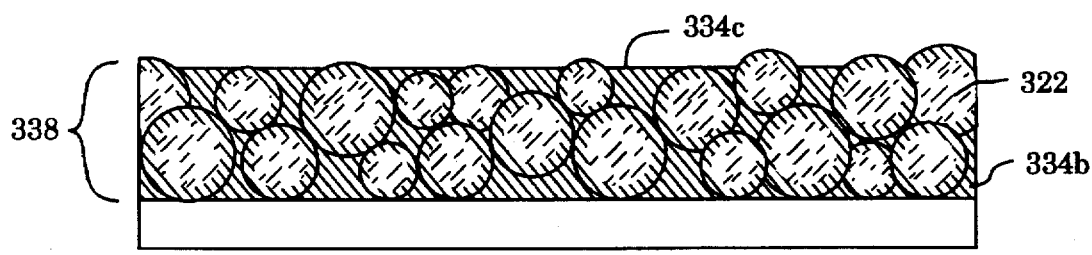
Figure 3F:
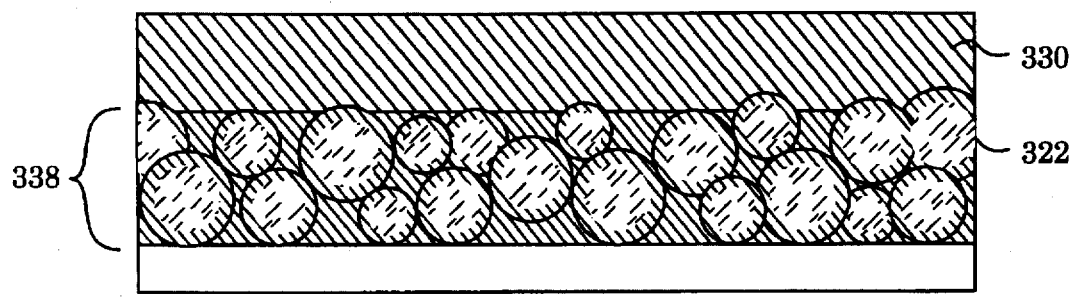

FIGS. 3a and 3b show the formation of an electrode. FIG. 3c shows the deposition of a novel low-viscosity electrolyte pre-wet, and the foaming of the pre-wet solution upon deposition. FIG. 3d shows removal of the foamy fraction of the pre-wet solution. FIG. 3e shows the absorption of the pre-wet solution into the porous electrode material. FIG. 3f shows the coating of the viscous electrolyte precursor material onto the surface of the pre-wet electrode.

As shown in FIG. 3a, an electrode (cathode or anode) paste 320 includes particulate electrode material 322 suspended in a carrier liquid 324, which is applied to a current collector substrate 326.

The negative electrode is the anode during discharge. In the case of an anode, the particulate material 322 would provide the anode active material subsequent to the removal of the carrier liquid 324. Typical anode active materials are well known in the art, and include, by way of example, lithium; lithium alloys such as alloys of lithium with aluminum, mercury, manganese, iron, or zinc; intercalation based anodes such as those using carbon or tungsten oxides; and the like.

Preferred anodes include lithium intercalation anodes employing carbon materials such as graphite, cokes, mesocarbons, and the like. Such carbon intercalation based anodes typically include a polymeric binder, i.e., a film-forming agent, suitable for forming a bound porous composite. The polymeric binder generally exhibits a molecular weight of from about 1,000 to about 5,000,000. Examples of suitable polymeric binders include ethylene propylene diene monomer (EPDM); polyvinylidene difluoride (PVDF), ethylene acrylic acid copolymer (EAA), ethylene vinyl acetate copolymer (EVA), EAA/EVA copolymers, and the like.

The anode may also include an electron conducting material such as carbon black.

The anode commonly includes a current collector laminated with the negative electrode material. Anode current collectors are well known to the art, and are typically comprised of nickel, iron, stainless steel, or copper foil. Preferably a copper foil sheet or grid is used. An adhesion promoter can be used to facilitate bonding between the anode material and the anodic current collector.

The positive electrode is the cathode during discharge. If the electrode is a cathode, the particulate material 322 would be a compatible cathode active material suspended in a carrier liquid 324, which is applied to a current collector substrate 326. Removal of the carrier liquid yields the cathode active structure.

Typical cathode active materials are well known to the art, and include insertion compounds, i.e., any material which functions as a positive pole in a solid electrolytic cell. Typical cathodic materials include, by way of example, transition metal oxides, sulfides, and selenides. Representative materials include oxides of cobalt, manganese, molybdenum, and vanadium; sulfides of titanium, molybdenum, and niobium; the various chromium oxides; copper oxides; and lithiated oxides of cobalt, manganese and nickel; and the like.

In a preferred embodiment, the cathodic material is mixed with an electroconductive material such as graphite, powdered carbon, powdered nickel, metal particles, conductive polymers, and the like; and a polymeric binder which forms a positive cathodic plate under pressure or other curing. The polymeric binder generally exhibits a molecular weight of from about 1,000 to about 5,000,000. Examples of suitable polymeric binders include ethylene propylene diene termonomer (EPDM); polyvinylidene difluoride (PVDF), ethylene acrylic acid copolymer (EAA), ethylene vinyl acetate copolymer (EVA), EAA/EVA copolymers, and the like.

A cathode generally includes a current collector 326 laminated with a positive electrode active material, i.e., the cathode structure. The cathode current collector is typically of aluminum, nickel, iron, stainless steel, or copper foil, and such foils having a protective conductive coating foil. Preferably the cathode current collector is a sheet or grid of aluminum. An adhesion promoter can be used to facilitate bonding between the cathode material and the cathodic current collector.

The specific carrier liquid 324 for the electrode paste will vary with the desired process parameters. When the carrier liquid is removed by drying, the carrier liquid is preferably a volatile liquid which is chemically inert to the particulates suspended therein. Suitable carrier liquids are well known to the art, and include acetone, xylene, alcohols, and the like.

The electrode paste is layered onto a current collector 326. The carrier liquid is then removed, for example by volatilization (drying) or other methods. The porous electrode structure 328 which remains, as shown in FIG. 3b, includes particulate electrode material formed into a sheet and held adjacent a current collector 326.

FIG. 3c shows the deposition of a low-viscosity electrolyte pre-wet material 334 over the porous electrode structure 328. Bubbles 332 and foam are formed within the low-viscosity electrolyte pre-wet material 334 immediately with and after the deposition.

The coating of the low-viscosity electrolyte pre-wet material 334 proceeds by methods well known to the art for the coating of such low-viscosity materials. For example, direct graveur rollers or direct rubber rollers can be used. Side scrapers can be used to control the width of the application.

The low-viscosity electrolyte pre-wet material 334 is characterized as having a low viscosity in comparison to the viscous electrolyte precursor. As noted above, the traditional viscous electrolyte precursor (330 in FIG. 3f) typically has a viscosity greater than 300 centipoise, generally in the range of 300 to 2,000 cp, more usually from 800 to 1,000 cp. In contrast, the low-viscosity electrolyte pre-wet material 334 has a viscosity in the range of about 20 to 40 centipoise, plus or minus ten percent; more preferably in the range of 25 to 35 cp. The low viscosity of the pre-wet material appears to be critical to the formation of a good chemical and physical interface between the porous electrode structure 328 and the viscous electrolyte precursor 340. As shown in FIG. 3c, the electrolyte pre-wet material has a sufficiently low viscosity that it can permeate the interstices in the porous electrode 328 to a much greater degree than can the viscous electrolyte precursor 230.

Chemically, the low-viscosity electrolyte pre-wet material 334 is similar to well-known viscous electrolyte precursors. However, the viscosity is significantly reduced by omitting the binder (film-forming) elements which are present in viscous electrolyte precursors. A typical low-viscosity electrolyte pre-wet material 334 of the subject invention includes a plasticizing solvent and a matrix forming polymer.

Suitable solvents are well known to the art and include, for example, organic solvents such as ethylene carbonate, propylene carbonate, as well as mixtures of these compounds. Higher boiling point plasticizer compounds, such as dibutyl phthalate, dimethyl phthalate, diethyl phthalate, and tris butyoxyethyl phosphate are also suitable as long as the viscosity of the pre-wet material can be maintained at a suitably low level.

Suitable solid polymeric matrix precursors are well known in the art, and include inorganic polymers, organic polymers, or a mixture of polymers with inorganic non-polymeric materials. Preferably, the polymeric matrix precursor is a solid-matrix forming monomer, or partial polymers of a solid-matrix forming monomer. One preferred polymeric matrix precursor is urethane acrylate.

A variety of suitable polymeric matrix forming materials are well known to the art. See, for example, the disclosures of U.S. Pat. Nos. 4,247,499; 4,388,385; 4,394,280; 4,414,337; 4,432,891; 4,539,276; 4,557,985; 4,925,751; and 4,990,413, the disclosure of each of which is incorporated herein.

Inorganic filler adjuncts, such as fumed alumina or silanized fumed silica may be used as desired. Other constituents, such as crosslink promoters, may also be provided in the electrolyte pre-wet.

The presence of foam or bubbles 332 in the completed battery is undesirable. As shown in FIG. 3d, it is possible to physically remove the uppermost layer of the low-viscosity electrolyte pre-wet material 334, and thus remove all, or substantially all, of the voids. A short time (conveniently, 1 to 10 seconds) after coating of the low-viscosity electrolyte pre-wet material 334, surplus low-viscosity electrolyte pre-wet material 334a, together with the bubbles 332 contained therein, are removed from the lower portion of the low-viscosity electrolyte pre-wet material 334b. A scraper or blade 336 is used to remove the unwanted excess, which can then be recycled. Generally, the surplus low-viscosity electrolyte pre-wet material 334a is removed to a level slightly above the surface of the porous electrode structure 328 to provide a scraped or shaved electrode/pre-wet structure.

While the specific amounts of materials used will not be critical within workable parameters, it has been found that application of the low-viscosity electrolyte pre-wet material 334 in the range of 7 to 10 mg/cm$^2$ is adequate. More preferably, the low-viscosity electrolyte pre-wet material 334 in the range of 8 to 9 mg/cm$^2$ is applied. Approximately half of the pre-wet coat is removed during the shaving process, leaving approximately 3 to 5 mg/cm$^2$ of the low-viscosity electrolyte pre-wet material on and within the porous electrode.

It is not generally advisable to layer a high-viscosity material directly onto a low-viscosity material, as the low-viscosity material provides insufficient friction for layering of the more viscous material. However, once excess low-viscosity electrolyte pre-wet material 334a has been removed, an unexpected phenomena occurs, as shown in FIG. 3e: the surface 334c of the low-viscosity electrolyte pre-wet material 334b recedes slightly into the porous electrode structure 328. This exposes the surface of the porous electrode structure 328, and permits the application of the viscous electrolyte precursor 330 onto the surface, as shown in FIG. 3f.

It is possible that the abatement of the low-viscosity electrolyte pre-wet material surface 334c represents a drying phenomenon, or a further incursion of the pre-wet material into the interstices or spaces within the porous electrode structure. However, it is believed that the recession of the low-viscosity electrolyte pre-wet material surface 334c occurs as the low-viscosity electrolyte pre-wet material is absorbed into the surface of particulate matter 322 which makes up the porous electrode structure, forming a permeated electrode structure 338.

The time necessary for abatement of the low-viscosity electrolyte pre-wet material surface 334c will vary with the materials used, and the thicknesses in which they are applied. Generally, 20 to 30 seconds is adequate to provide a surface upon which the viscous electrolyte precursor can be applied. This time period may be accelerated by adding 1% or less of a surfactant, for instance a fluorosurfactant, to the low-viscosity electrolyte pre-wet material 334. The penetration of the low-viscosity electrolyte pre-wet material 334 into the porous electrode material can be determined visually: the glossy sheen of the low-viscosity electrolyte pre-wet material 334 becomes matte and grayed as the surface recedes into the porous electrode structure 328. When the surface appears matte, the viscous electrolyte precursor may be applied to the permeated electrode structure 338.

The coating of the viscous electrolyte precursor 330 proceeds by methods well known to the art. For example, slot die coating or reversed roll coating can be used. Generally, the viscous electrolyte precursor is coated to a thickness of approximately 10 to 100 microns.

The time necessary for the coating of the viscous electrolyte precursor may be accelerated by adding 1% or less of a surfactant, for instance a fluorosurfactant, to the viscous electrolyte precursor 330.

Unlike the prior art coating processes, there is no bubble formation during the coating process of the viscous electrolyte precursor 330. The mechanical and chemical interfaces between the porous electrode and the electrolyte precursor (and, thus, the cured solid electrolyte) are vastly improved over that of the prior art.

Viscous electrolyte precursors are well known to the art, and are described above with reference to the low viscosity pre-wet material. The viscous electrolyte precursor materials generally have a viscosity greater than 300 centipoise, generally in the range of 300 to 2,000 cp, more usually in the range of 800 to 1,500 cp. They comprise matrix forming precursors which can be cured, polymerized, or otherwise formed into a solid matrix. Any such processing will be referred to hereinafter as "curing", for ease of expression and not by way of limitation.

The solid matrix derived from the precursor is capable of ionically conducting inorganic cations (e.g., alkali ions). Alkali salt are those salts wherein the cation of the salt is an alkali selected from the group consisting of lithium, sodium, potassium, rubidium, and cesium, and which are suitable for use in the solvent-containing electrolyte and in the composite electrodes of an electrolyte cell and in the solvent. For ease of reference, and not by way of limitation, the alkali ion referenced herein is the lithium ion.

Electrolyte solvents are one or more solvents (i.e., plasticizers) included in the composite electrode and the electrolyte for the purpose of solubilizing alkali salts during operation of the electrolytic cell. The electrolytic solvent also acts as a plasticizer. The solvent can be any low volatile aprotic polar solvent.

If the solid-matrix forming material (monomer or partial polymer thereof) employed in the anode or cathode herein is cured by radiation polymerization to form a solid matrix, the plasticizer should be radiation inert at least up to the levels of radiation employed. If the solid-matrix forming monomer or partial polymer is cured by thermal polymerization, then the plasticizer should be thermally inert at least up to the temperatures of thermal polymerization.

EXAMPLES

A cathodic current collector is prepared. A cathodic powder is made into a slurry, which is then spread onto the current collector. The slurry is dried to form a porous cathode structure.

An anodic current collector is prepared. An anodic powder is made into a slurry, which is then spread onto the current collector. The slurry is dried to form a porous anode structure.

A cathode/solid electrolyte structure is prepared by placing a low-viscosity electrolyte pre-wet solution onto the cathode surface. The pre-wet is then processed to provide a suitable surface for application of the viscous electrolyte precursor. The viscous electrolyte precursor is applied, and the viscous electrolyte precursor material is cured to provide a solid electrolyte composition on the surface of the cathode structure. A battery is formed by laminating the cathode/electrolyte structure with an anode structure.

An anode/solid electrolyte structure is prepared by placing a low-viscosity electrolyte pre-wet solution onto the anode surface. The pre-wet is then processed to provide a suitable surface for application of the viscous electrolyte precursor. The viscous electrolyte precursor is applied, and the viscous electrolyte precursor material is cured to provide a solid electrolyte composition on the surface of the anode structure. A battery is formed by laminating the anode/electrolyte structure with a cathode structure.

A preferred battery is formed by laminating an anode/electrolyte structure with a cathode/electrolyte structure to provide a solid electrolytic cell.

A continuous process method for producing electrode/electrolyte structures is also shown.

Example 1

Cathode Current Collector

The cathode current collector employed is a sheet of aluminum foil. A layer of adhesion promoter is applied to the surface of the foil which will contact the cathode. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio. (Alternatively, aluminum mesh can be used as the current collector.)

The adhesion promoter layer is prepared as a dispersed colloidal solution in one of two methods, as described in U.S. Ser. No. 08/237,747, now U.S. Pat. No. 5,508,129, the disclosure of which is incorporated herein.

Example 2

Cathode Powder

Cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

Example 3

Porous Cathode Structure

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM (ethylene propylene diene monomer) | 1.8% |
| Xylene | 40.0% |

The percentage of solids is approximately 60.0±0.5 weight percent. The viscosity is approximately 2,000±200 cp.

100 grams of the cathode slurry is produced by mixing 1.8 grams of EPDM (Mooney viscosity of 26±5 and available as VISTALON™ 2504 (Exxon Chemicals Co., Houston, Tex.) with 16.2 grams of xylene to form a 10.0 wt. % EPDM solution. The temperature is maintained between 40° C. and 45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The EPDM-xylene solution is passed through a column of 4A molecular sieves. The sieved solution is then added to the $LiMn_2O_4$ and carbon blend, under vacuum mixing, over a 5 minute period, during which time an additional 23.8 grams of xylene are added. Afterwards, the mixing speed is increased from 7.5 to 20 Hz and maintained for another 5 minutes. The temperature of the mixture is then gradually raised to 85° C. over about a 45 minute period and maintained at the elevated temperature for about 30 minutes. The mixing speed is then decreased to about 1 Hz and subsequently the temperature of the mixture is allowed to decrease gradually to about 45° C. over about a 30 minute period. Finally, the mixture is mixed for 5 minutes at this temperature.

The cathode slurry is then extruded to coat to the current collector at a substantially uniform thickness of about 25–200 μm, more preferably 50–100 μm, and most preferably about 100 μm. This can be accomplished using a doctor blade, Meyer-rod, slot die, or reverse roll coating. The cathode slurry/current collector is heated to remove the xylene and produce a porous cathode structure.

Example 4

Anode Current Collector

The anode current collector employed is a sheet of copper foil, about 0.33 mils (8.5 μm) to 0.5 mils (12.7 μm) thick, having a layer of adhesion promoter attached to the surface of the foil. The adhesion promoter will contact the anode so as to form a composite having a sheet of copper foil, an anode and a layer of adhesion promoter interposed therebetween. (Alternatively, copper mesh can be used as the current collector.)

The same adhesion promoter composition used with the cathode and described above is employed with the anode.

Example 5

Anode Powder

Anode powder is prepared by combining about 93.81 weight percent of Mitsubishi Gas Carbon (Mitsubishi Petroleum Co. Ltd., Tokyo, Japan), a coke-like material; and about 6.19 weight percent of carbon (Shawinigan Black™). About 100 grams of the resulting mixture is placed into a grinding machine (Attritor Model S-1) and ground for 30 minutes at 150 rpm. The resulting mixture is passed through a 200 mesh screen and then vacuum dried at 60° C. to produce an anode powder with a water content of less than about 1000 ppm and preferably less than about 300 ppm.

Example 6

Porous Anode Structure

An anode slurry is prepared by combining sufficient anode powder according to Example 5 to provide for a final product having about 54.6 weight percent of the Mitsubishi Gas Carbon. The slurry contains the following (in approximate weight percent):

| Mitsubishi Gas Carbon | 54.6% |
|---|---|
| Carbon | 3.6% |
| EPDM (ethylene propylene diene monomer) | 1.8% |
| Xylene | 40.0% |

The percentage of solids is approximately 60.0±0.5 weight percent. The viscosity is approximately 1,500±100 cp.

100 grams of the anode slurry can be prepared by mixing 1.8 grams of EPDM (VISTALON™ 2504) in 16.2 grams of xylene to form a 10.0 wt. % EPDM solution. The temperature is maintained between 40° and 45° C. as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer and the blend is stirred at 7.5 Hz and 25° C. The EPDM-xylene solution is passed through a column of 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. The temperature of the mixture is then gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The anode slurry is then extruded to coat the anode current collector at a substantially uniform thickness of about 25–200 µm, more preferably 50–100 µm, and most preferably about 50 µm. This can be accomplished using a doctor blade, Meyer-rod, slot die, or reverse roll coating. The anode slurry/current collector sheet is heated to remove the xylene and produce a porous anode structure.

Example 7

Electrolyte Pre-Wet 40.40 grams of propylene carbonate, 40.40 grams of ethylene carbonate, 3.80 grams of trimethylol propyl triacrylate (TMPTA), and 15.40 grams of urethane acrylate (Actilane SP023, available from Akcros Chemicals, Ltd., Manchester, England) are combined at room temperature until homogeneous. The resulting solution is optionally passed through a column of 4A molecular sieves to remove water and the recovered solution is mixed at room temperature until homogeneous. If necessary, the ethylene carbonate can first be dissolved in propylene carbonate with heat.

The resulting solution contains the following in approximate weight percent based on the total weight of the electrolyte solution (100 g):

| Propylene Carbonate | 40.40% |
|---|---|
| Ethylene Carbonate | 40.40% |
| Trimethylol propyl triacrylate (TMPTA) | 3.80% |
| Urethane Acrylate | 15.40% |
| Total | 100.0% |

The viscosity is approximately 20 to 30 cp.

Example 8

Electrolyte 36.26 grams of propylene carbonate, 3.45 grams of trimethyl propyl triacrylate, 36.26 grams of ethylene carbonate, and 13.79 grams of urethane acrylate (Actilane SP023, available from Akcros Chemicals, Ltd., Manchester, England) are combined at room temperature until homogeneous. The resulting solution is optionally passed through a column of 4A molecular sieves to remove water and the recovered solution is mixed at room temperature until homogeneous. If necessary, the ethylene carbonate can first be dissolved in propylene carbonate with heat.

1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° C. and 65° C. with stirring until the film forming agent is dissolved. A thermocouple is placed at the edge of the vortex created by the magnetic stirrer to monitor solution temperature.

The solution is cooled to a temperature of less than 48° C., and 8.77 grams of LiPF$_6$ is added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following in approximate weight percent based on the total weight of the electrolyte solution (100 g):

| Propylene Carbonate | 36.26% |
|---|---|
| Ethylene Carbonate | 36.26% |
| Trimethylol propyl triacrylate (TMPTA) | 3.45% |
| Urethane Acrylate | 13.79% |
| LiPF$_6$ | 8.77% |
| PEO Film Forming Agent | 1.47% |
| Total | 100% |

The solution is degassed to provide for an electrolyte solution wherein little, if any, of the LiPF$_6$ salt decomposes. The viscosity is approximately 800 to 1,000 cp.

Optionally, the above solution which contains the prepolymer, the film forming agent (binder), the electrolytic solvent and the LiPF$_6$ salt, is filtered to remove any solid particles or gels remaining in the solution. One suitable filter device is a sintered stainless steel screen having a pore size between 1 and 50 µm at 100% efficiency.

Alternate electrolyte preparation methods are described in U.S. Ser. No. 08/237,747, now U.S. Pat. No. 5,508,129.

Example 9

Cathode/Electrolyte Laminate

A porous cathode and current collector structure is prepared according to Example 3. Electrolyte pre-wet solution according to Example 7 is coated onto the porous cathode surface at a coat weight of 8 to 9 mg/cm$^2$. The width of the pre-wet application is controlled using side-scrapers. After three to five seconds, bubbles, foam, and excess pre-wet solution are shaved from the surface of the sheet, leaving a final pre-wet coat of 3 to 5 mg/cm$^2$ pre-wet over the porous cathode structure. After 20 to 30 seconds the pre-wet has been absorbed below the level of the cathode surface, and the viscous electrolyte precursor of Example 8 is coated over the porous cathode/pre-wet sheet using a slot die coater or a reverse roll flexographic coater to a thickness of about 100 µm. The electrolyte and cathode/pre-wet sheet are then simultaneously cured by passing the layered sheet through an electron beam apparatus (available as a Broad Beam electron beam processor from RPC Industries, Hayward, Calif.) at a voltage of about 250 kV and a current of about 48 mA, with a conveyor speed of about 50 feet per minute. After curing, the completed composite contains a solid electrolyte laminated to a solid cathode which is affixed to a current collector.

Example 10

Solid Electrolytic Cell #1

A current collector/cathode/electrolyte laminate sheet according to Example 9 is prepared. The electrolyte is applied to a thickness of approximately 100 µm. A current collector/anode sheet according to Example 6 is prepared.

A sheet comprising a solid battery is prepared by laminating the current collector/anode sheet to the surface of the electrolyte of the current collector/cathode/electrolyte laminate, so that the electrolyte is positioned between the anode and the cathode. Lamination is accomplished by minimal pressure.

Example 11

Anode/Electrolyte Laminate

A porous anode and current collector structure is prepared according to Example 6. Electrolyte pre-wet solution according to Example 7 is coated onto the porous cathode surface at a coat weight of 8 to 9 mg/cm$^2$. The width of the pre-wet application is controlled using side-scrapers. After three to five seconds, bubbles, foam, and excess pre-wet solution are shaved from the surface of the sheet, leaving a final pre-wet coat of 3 to 5 mg/cm$^2$ pre-wet over the porous anode structure. After 20 to 30 seconds the pre-wet has been absorbed below the level of the anode surface, and the viscous electrolyte precursor of Example 8 is coated over the porous anode/pre-wet sheet using a slot die coater or a reverse roll flexographic coater to a thickness of about 100 µm. The electrolyte and anode/pre-wet sheet are then simultaneously cured by passing the layered sheet through an electron beam apparatus (available as a Broad Beam electron beam processor from RPC Industries, Hayward, Calif.) at a voltage of about 250 kV and a current of about 48 mA, with a conveyor speed of about 50 feet per minute. After curing, the completed composite contains a solid electrolyte laminated to a solid anode which is affixed to a current collector.

Example 12

Solid Electrolytic Cell #2

A current collector/anode/electrolyte laminate sheet according to Example 11 is prepared. The electrolyte is applied to a thickness of approximately 100 µm. A current collector/cathode sheet according to Example 3 is prepared.

A sheet comprising a solid battery is prepared by laminating the current collector/cathode sheet to the surface of the electrolyte of the current collector/anode/electrolyte laminate, so that the electrolyte is positioned between the anode and the cathode. Lamination is accomplished by minimal pressure.

Example 13

Preferred Solid Electrolytic Cell

A current collector/anode/electrolyte laminate sheet according to Example 11 is prepared. The electrolyte is applied to a thickness of approximately 50 µm. A corresponding current collector/cathode/electrolyte laminate sheet according to Example 9 is prepared. The electrolyte is applied to a thickness of approximately 50 µm.

A sheet comprising a solid battery is prepared by laminating the current collector/cathode/electrolyte sheet to the surface of the electrolyte of the current collector/anode/electrolyte laminate, so that both electrolyte layers are positioned between the anode and the cathode. Lamination is accomplished by minimal pressure.

Example 14

Continuous Process Method

Figure 4:
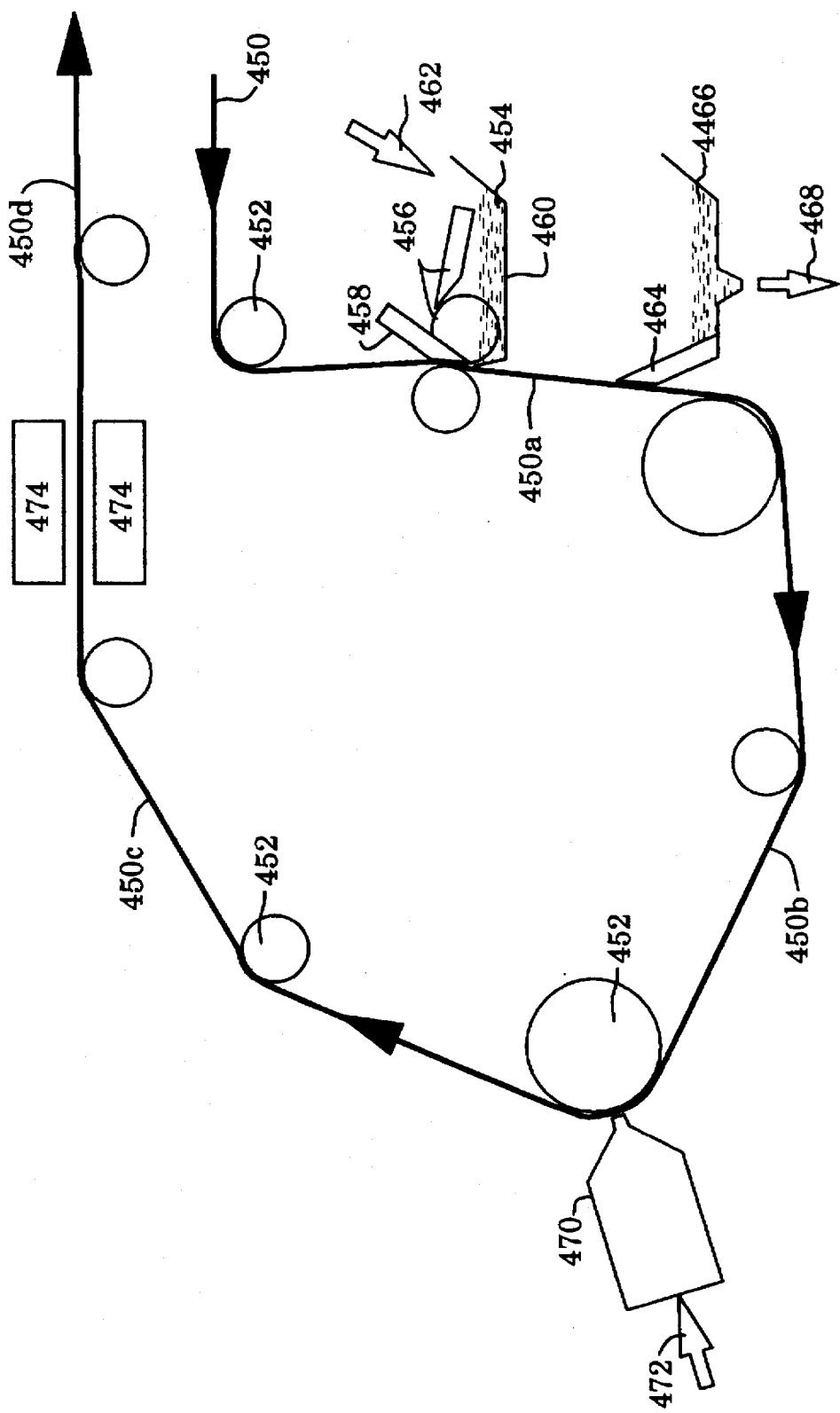
FIG. 4 is a schematic diagram of a continuous process for forming a cured electrode/electrolyte laminate structure.

An electrode of this invention can be made in a continuous (rather than batch) process, as shown in FIG. 4. A continuous sheet 450 of electrode material is processed at various stations along the continuous process pathway. The line speed is approximately 10 to 50 feet per minute. A variety of spools 452 control the direction and angularity of the electrode sheet.

A porous electrode sheet 450 is fed into a pre-wet coating station. A low-viscosity pre-wet solution 454 is applied using a direct gravure roller device 456. A side scraper 458 maintains a straight edge at the border of the pre-wet application path. Excess pre-wet solution is returned to the pre-wet solution container 460. Additional pre-wet solution is added to the container 460 as needed, as indicated by arrow 462.

The pre-wet solution is applied to the desired thickness to produce a porous electrode/pre-wet sheet 450a. The porous electrode/pre-wet sheet 450a develops surface bubbles, which are removed with a scraper or blade 464. Conveniently, the scraper blade apparatus is located such that at least three seconds passes between the application of the pre-wet solution and the removal of excess pre-wet solution. At a line speed of 10–15 feet per minute, a minimum of six inches is provided between these stations.

Excess pre-wet solution is captured in the recycling container 466, and is preferably re-cycled for re-use, as shown by arrow 468. The trimmed porous electrode/pre-wet sheet 450b travels approximately 60 inches (30 seconds) to the viscous electrolyte precursor application station, allowing the pre-wet solution to further permeate the porous electrode.

The viscous electrolyte precursor is applied using a slot die coating device 470 backed by a precision steel backing roll. Additional viscous electrolyte precursor is added to the slot die coating device 470 as necessary for continuous processing, as indicated by arrow 472.

The electrode/electrolyte sheet 450c traverses an e-beam machine 474 for curing of the electrolyte and/or electrode. The cured electrode/electrolyte sheet 450d is then used, or collected for later use (not shown).

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

We claim:

1. A method of preparing a porous electrode structure having an electrolyte layer thereupon, said method comprising:

(a) preparing a porous electrode structure;

(b) layering excess low-viscosity electrolyte pre-wet material upon an electrode surface of the porous electrode;

(c) removing excess low-viscosity electrolyte pre-wet material to remove bubbles and form a scraped pre-wet material;

(d) allowing the scraped pre-wet material to absorb into the porous electrode structure; and (e) applying a viscous electrolyte precursor material to the surface of the porous electrode structure with absorbed pre-wet material.

2. A method of claim 1 wherein said low-viscosity electrolyte pre-wet material has a viscosity of about 20 to 40 centipoise.

3. A method of claim 1 wherein said low-viscosity electrolyte pre-wet material comprises a matrix forming polymer and a plasticizing solvent.

4. A method of claim 1 wherein said viscous electrolyte precursor has a viscosity of greater than 300 centipoise.

5. A method of claim 1 wherein said step of preparing a porous electrode structure further comprises the step of preparing a porous electrode structure upon a current collector.

6. A method of claim 1 wherein said scraped pre-wet material is present at approximately 3 to 5 mg/cm$^2$.

7. A method of preparing a porous electrode structure having an electrolyte layer thereupon, said method comprising the steps of:

(a) layering a low-viscosity electrolyte pre-wet material upon a porous electrode surface;

(b) scraping the surface of the low-viscosity electrolyte pre-wet material to remove bubbles formed therein;

(c) allowing the scraped low-viscosity electrolyte pre-wet material to permeate the porous electrode; and (c) applying a viscous electrolyte precursor material to the surface of the porous electrode permeated with low-viscosity pre-wet material.

8. A method of claim 7 wherein said low-viscosity electrolyte pre-wet material has a viscosity of about 20 to 40 centipoise.

9. A method of claim 7 wherein said low-viscosity electrolyte pre-wet material comprises a matrix forming polymer and a plasticizing solvent.

10. A method of claim 7 wherein said step of preparing a porous electrode structure further comprises the step of preparing a porous electrode structure upon a current collector.

11. A method of preparing a battery having a solid electrolyte, said method comprising the steps of:

(a) preparing a porous cathode structure;

(b) layering a low-viscosity electrolyte pre-wet material upon a cathodic surface of the porous cathode;

(c) shaving the surface of the low-viscosity electrolyte pre-wet material upon the surface of the porous cathode to remove any bubbles formed thereupon;

(d) applying a viscous electrolyte precursor material to the surface of the shaved cathode/pre-wet surface to produce a cathode/electrolyte structure;

(e) preparing a porous anode structure;

(f) layering a low-viscosity electrolyte pre-wet material upon an anodic surface of the porous anode;

(g) shaving the surface of the low-viscosity electrolyte pre-wet material upon the surface of the porous anode to remove any bubbles formed thereupon;

(h) applying a viscous electrolyte precursor material to the surface of the shaved anode/pre-wet surface to produce an anode/electrolyte structure;

(i) laminating together the electrolyte surfaces of the cathode/electrolyte structure and the anode/electrolyte structure to form an anode/electrolyte/cathode structure; and (j) curing the electrolyte.

12. A method of claim 11 wherein said low-viscosity electrolyte pre-wet material has a viscosity of about 20 to 40 centipoise.

13. A method of claim 11 wherein said low-viscosity electrolyte pre-wet material comprises a matrix forming polymer and a plasticizing solvent.

14. A method of claim 11 wherein said step of preparing a porous cathode structure comprises the step of preparing a porous cathode structure layered upon a cathodic current collector.

* * * * *